US008139338B2

(12) United States Patent
Väätäinen et al.

(10) Patent No.: US 8,139,338 B2

(45) Date of Patent: Mar. 20, 2012

(54) LOAD CONTROL APPARATUS

(75) Inventors: Timo Väätäinen, Espoo (FI); Pertti Seväkivi, Lepsämä (FI); Vesa Tiihonen, Beijing (CN)

(73) Assignee: ABB Oy, Helsinki (FI)

(*) Notice: Subject to any disclaimer, the term of this patent is extended or adjusted under 35 U.S.C. 154(b) by 543 days.

(21) Appl. No.: 12/357,800

(22) Filed: Jan. 22, 2009

(65) Prior Publication Data

US 2009/0190281 A1 Jul. 30, 2009

(30) Foreign Application Priority Data

Jan. 25, 2008 (FI) ..................................... 20085063

(51) Int. Cl.
*H02H 5/04* (2006.01)

(52) U.S. Cl. ...................................................... 361/103

(58) Field of Classification Search .................. 361/103, 361/106

See application file for complete search history.

(56) References Cited

U.S. PATENT DOCUMENTS

| | | | | |
|---|---|---|---|---|
| 3,857,068 | A | 12/1974 | Braunstein | |
| 4,739,232 | A | 4/1988 | Ishimoto | |
| 5,590,010 | A * | 12/1996 | Ceola et al. | 361/93.4 |
| 5,666,272 | A * | 9/1997 | Moore et al. | 361/735 |
| 5,923,520 | A | 7/1999 | Ikeda et al. | |
| 2006/0109074 | A1* | 5/2006 | Lee et al. | 337/167 |
| 2009/0190281 | A1* | 7/2009 | Vaatainen et al. | 361/103 |
| 2009/0206059 | A1* | 8/2009 | Kiko | 218/143 |

FOREIGN PATENT DOCUMENTS

| | | | |
|---|---|---|---|
| DE | 38 43 277 | A1 | 6/1990 |
| DE | 39 24 465 | A1 | 2/1991 |
| GB | 2 249 218 | A | 4/1992 |
| GB | 2 292 850 | A | 3/1996 |
| JP | 7-98169 | A | 4/1995 |
| JP | 2001-176371 | A | 6/2001 |
| JP | 2003-324179 | A | 11/2003 |
| WO | WO 2007/120914 | A2 | 10/2007 |

OTHER PUBLICATIONS

Finnish Search Report dated Jun. 2, 2008.

An English Translation of the Notification of the First Office Action dated Oct. 8, 2010, issued in the corresponding Chinese Patent Application No. 200910008464.6.

* cited by examiner

*Primary Examiner* — Ronald W Leja

(74) *Attorney, Agent, or Firm* — Buchanan Ingersoll & Rooney PC

(57) ABSTRACT

A load control apparatus adapted to indirectly detect an overcurrent, i.e. a current magnitude exceeding a predetermined limit value, occurring in an electric conductor element (4) belonging to a load current circuit (20), on the basis of an increase in temperature. The load control apparatus (30) comprises a control current circuit including a temperature-sensitive switch member (S) capable of changing its operational state in response to an increase in the temperature to a predetermined value, and a control unit (32) adapted to detect a change in the operational state of the temperature-sensitive switch member (S), and to detect an overcurrent occurring in the electric conductor element (4) based thereon, the temperature-sensitive switch member (S) being adapted to be connected heat-conductively to a target element, in which at least part of the load current of the electric conductor element (4) passes in an operating situation, and the temperature-sensitive switch member (S) being further adapted to be electrically insulated from the electric conductor element (4) of the load current circuit.

10 Claims, 2 Drawing Sheets

LOAD CONTROL APPARATUS

BACKGROUND OF THE INVENTION

The invention relates to a load control apparatus adapted to indirectly detect an overcurrent occurring in an electric conductor element belonging to a load current circuit on the basis of an increase in temperature.

A known load control apparatus capable of detecting an overcurrent comprises a temperature sensor for each controlled electric conductor element of the load current circuit. The load control apparatus comprises an electronics circuit including a signal input terminal for each temperature sensor. The load control apparatus calculates the temperature corresponding to the output signal of each temperature sensor, and detects any overcurrent on the basis of an increase in temperature.

The problem in the above described load control apparatus is its complexity and expensiveness.

BRIEF DESCRIPTION OF THE INVENTION

The object of the invention is to provide a load control apparatus for solving the above problems. The object of the invention is achieved with a load control apparatus characterized in what is stated in independent claim 1. Preferred embodiments of the invention are described in the dependent claims.

The invention is based on detecting an overcurrent by means of a change in the operational state of a temperature-sensitive switch member connected heat-conductively to the load circuit being controlled but electrically isolated therefrom.

An advantage of the load control apparatus of the invention is its simplicity and inexpensive manufacturing costs. These advantages are emphasized in embodiments wherein the load control apparatus comprises a plurality of series-connected, normally closed-type temperature-sensitive switch members, each of which is connected to one controlled point of the load, whereby an overcurrent occurring in any controlled point of the load can be detected by observing the opening of the control current circuit comprising the series-connected temperature-sensitive switch members.

Since the temperature-sensitive switch member of the load control apparatus of the invention is not part of the load current circuit, the detection of an overcurrent by means of a change in the operational state of the temperature-sensitive switch member does not interfere in any way with the operation of the load current circuit. Furthermore, since the temperature-sensitive switch member is not part of the load current circuit, it does not have to be designed to endure currents occurring in the load current circuit.

BRIEF DESCRIPTION OF THE FIGURES

In the following, the invention will be described in more detail in connection with preferred embodiments with reference to the accompanying drawings, in which.

DETAILED DESCRIPTION OF THE INVENTION

Figure 1:
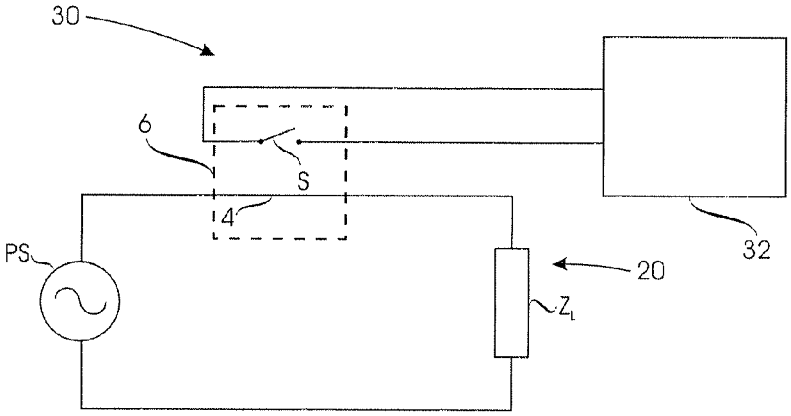
FIG. 1 shows a simplified connection diagram of a load control apparatus according to an embodiment of the invention.

FIG. 1 shows a simplified connection diagram of a load control apparatus 30, adapted to indirectly detect an overcurrent occurring in a electric conductor element 4 belonging to a load current circuit 20. The load control apparatus 30 comprises a control unit 32 and a temperature-sensitive switch member S. The temperature-sensitive switch member S is capable of changing its operational state in response to an increase in the temperature to a predetermined value. The temperature-sensitive switch member S is part of a control current circuit electrically connected to the control unit 32. The control unit 32 is adapted to detect whether the control current circuit is open or closed.

The temperature-sensitive switch member S is connected heat-conductively to the electric conductor element 4. The heat-conductive connection is denoted with a rectangle 6 drawn with a dotted line. The electric conductor element 4 and the temperature-sensitive switch member S are electrically isolated from one another.

The type of the temperature-sensitive switch member S may be a normally closed type of switch member. This being so, an overcurrent occurring in the electric conductor element 4 increases the temperature of the electric conductor element 4, and the increase in the temperature is transmitted via the heat-conductive connection 6 to the temperature-sensitive switch member S. The heating of the temperature-sensitive switch member S changes the operational state of the temperature-sensitive switch member from closed into open, opening the control current circuit. The control unit 32 detects the opening of the control current circuit, and thus detects the overcurrent occurring in the electric conductor element 4.

Alternatively, the type of the temperature-sensitive switch member S may be a normally open type of switch member. This being so, an increase in the temperature changes the operational state of the temperature-sensitive switch member from open into closed, closing the control current circuit. The control unit 32 detects the overcurrent based on the closing of the control current circuit.

The load current circuit includes a power source PS that is loaded with a load impedance $Z_L$. The electric conductor element 4 conveys load current between the power source PS and the load impedance $Z_L$.

Figure 2:
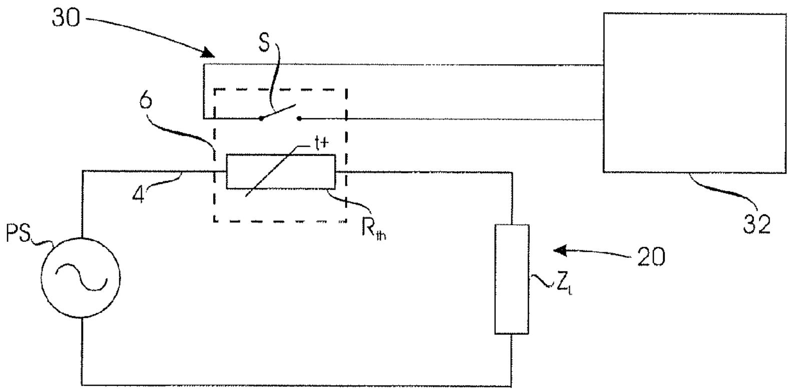
FIG. 2 shows a simplified connection diagram of a load control apparatus according to another embodiment of the invention.

The load control apparatus shown in FIG. 2 is similar to the load control apparatus shown in FIG. 1, except for a thermistor member $R_{th}$ that is connected in series with the electric conductor element 4. The type of the thermistor member $R_{th}$ is a PTC thermistor, whose resistance increases as its temperature increases. The thermistor member $R_{th}$ is connected heat-conductively to the temperature-sensitive switch member S.

Since the thermistor member $R_{th}$ is connected electrically in series with the electric conductor element 4, the same current passes through the thermistor member $R_{th}$ as through the load impedance $Z_L$. The thermistor member $R_{th}$ improves the sensitivity of the load control apparatus to an overcurrent, since, as the current passing through the thermistor member $R_{th}$ increases, the resistance of the thermistor member $R_{th}$ increases, and thus more heat than previously is also generated in the thermistor member $R_{th}$, to which the temperature-sensitive switch member S reacts.

In alternative embodiments of the invention, the load control apparatus may comprise, per each controlled electric conductor element, a thermistor assembly adapted to be connected heat-conductively to said electric conductor element of the load current circuit. The thermistor assembly is adapted to be connected heat-conductively to the temperature-sensitive switch member for detecting a temperature change caused by an overcurrent in the thermistor assembly.

The thermistor assembly may comprise a plurality of thermistor members, which may comprise PTC thermistors and NTC thermistors. The thermistor assembly may comprise one or more thermistor members adapted to be connected in parallel with the controlled electric conductor element of the load current circuit. The thermistor assembly is adapted such that the temperature-sensitive switch member reacts in the desired manner to an overcurrent in the electric conductor element of the load current circuit.

It is obvious to a person skilled in the art that in the above text, the term 'thermistor member' is used in a very broad sense. For example, in the above text, a PTC thermistor refers generally to a component whose resistance increases more steeply due to its temperature rise than the resistance of the electric conductor element of the load current circuit.

Figure 3:
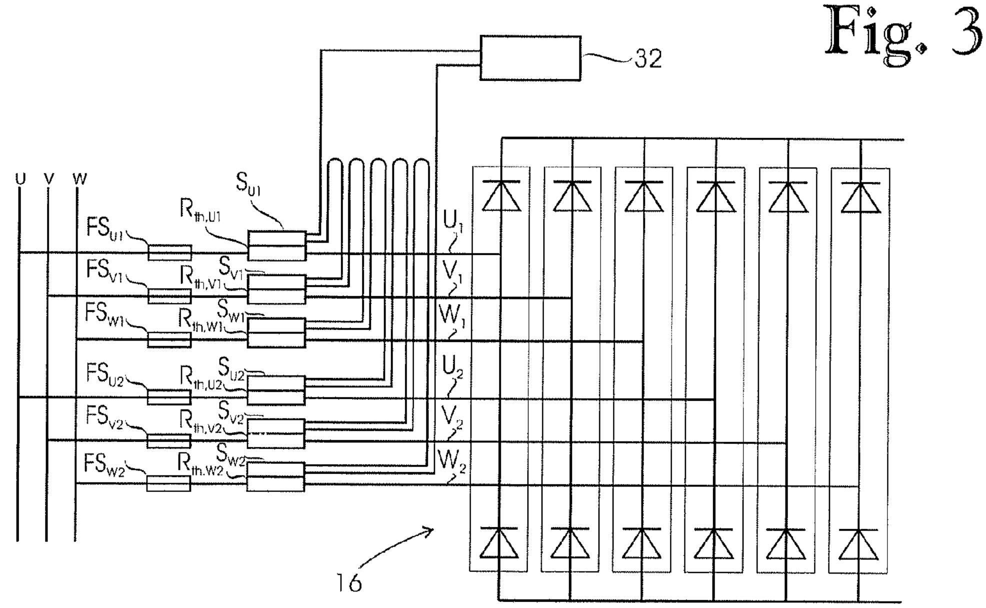
FIG. 3 shows a rectifier assembly comprising a load control apparatus adapted to monitor the currents in a six-pulse bridge.

FIG. 3 shows a rectifier assembly comprising a six-pulse bridge 16 and a load control apparatus adapted to monitor currents of the six-pulse bridge. For each phase, the six-pulse bridge 16 comprises two parallel diode branches for increasing the current/power capacity. Accordingly, the six-pulse bridge 16 comprises twelve diodes in total. Phase U of the power source is connected to the six-pulse bridge 16 via electric conductor elements $U_1$ and $U_2$, phase V of the power source is connected to the six-pulse bridge 16 via electric conductor elements $V_1$ and $V_2$, and phase W of the power source is connected to the six-pulse bridge 16 via electric conductor elements $W_1$ and $W_2$. The rectifier assembly comprises six thermistor members $R_{th,U1}$, $R_{th,V1}$, $R_{th,W1}$, $R_{th,U2}$, $R_{th,V2}$, and $R_{th,W2}$, each of which is connected in series with a corresponding electric conductor element. The load current circuit comprises a fuse connected in series with each thermistor member such that fuses $FS_{U1}$, $FS_{V1}$, $FS_{W1}$, $FS_{U2}$, $FS_{V2}$ and $FS_{W2}$ are connected in series with thermistor members $R_{th,U1}$, $R_{th,V1}$, $R_{th,W1}$, $R_{th,U2}$, $R_{th,V2}$, and $R_{th,W2}$, respectively.

The control current circuit connected to the control unit 32 includes six normally closed-type temperature-sensitive switch members $S_{U1}$, $S_{V1}$, $S_{W1}$, $S_{U2}$, $S_{V2}$ and $S_{W2}$, connected in series. The temperature-sensitive switch members $S_{U1}$, $S_{V1}$, $S_{W1}$, $S_{U2}$, $S_{V2}$ and $S_{W2}$ are connected heat-conductively to thermistor members $R_{th,U1}$, $R_{th,V1}$, $R_{th,W1}$, $R_{th,U2}$, $R_{th,V2}$, and $R_{th,W2}$, correspondingly.

An increase in the temperature of any of the temperature-sensitive switch members of the control current circuit opens said temperature-sensitive switch member and, thus, the entire control current circuit. For example, if the fuse $FS_{W2}$ of electric conductor element $W_2$ blows, the load current of phase W starts to pass entirely via electric conductor element W1, which causes an overcurrent in electric conductor element W1. An overcurrent occurring in electric conductor element W1 increases the temperature of electric conductor element W1, resulting in an increase also in the temperature of temperature-sensitive switch member $S_{W1}$. The temperature-sensitive switch member $S_{W1}$ opens when its temperature rises to a predetermined value, whereby also the control current circuit opens, and the control unit 32 detects the overcurrent occurring in the load current circuit.

It is obvious to a person skilled in the art that the bridge controlled with the load control apparatus shown in FIG. 3 may be, instead of a diode bridge, a semi-controlled or a fully controlled bridge, and that the bridge may be of another type than a six-pulse bridge. It is also obvious that the bridge to be controlled may be part of a broader entity. The bridge to be controlled may be, for instance, a rectifier bridge belonging to the rectifier unit of a frequency converter assembly or an inverter bridge belonging to an inverter unit of a frequency converter assembly. Furthermore, it is obvious that the load control apparatus of the invention may be used for the control of other types of load current circuits than bridge connections.

It was stated above that for detecting an overcurrent occurring in the electric conductor element of load current circuit, a temperature-sensitive switch member may be connected heat-conductively to the electric conductor element of the load current circuit or to a thermistor member or thermistor assembly connected conductively to an electric conductor element. However, it is obvious that the temperature-sensitive switch member of the load control apparatus of the invention may be adapted to be connected heat-conductively to any target element in which at least part of the load current of the electric conductor element of the load current circuit passes in an operating situation.

Figure 4:
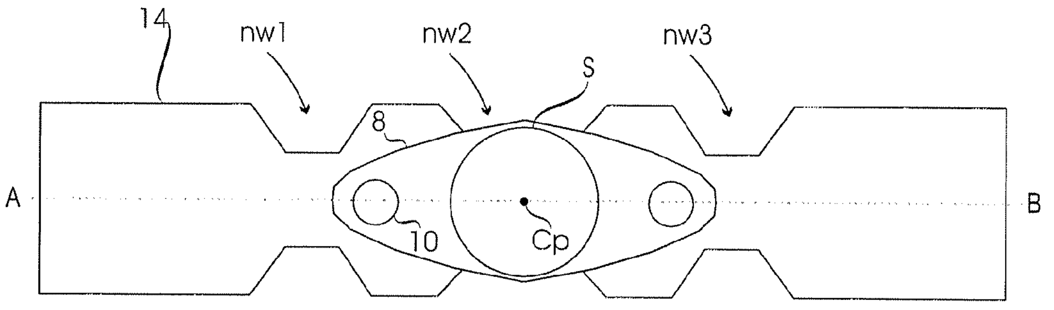
FIG. 4 shows an assembly including a narrowing member and a temperature-sensitive switch member connected thereto.

FIG. 4 shows an assembly belonging to a load control apparatus according to an embodiment of the invention and including a narrowing member 14 and a temperature-sensitive switch element S connected thereto. The narrowing member 14 is adapted to be connected in series with an electric conductor element of the load current circuit, whereby the same current passes through the narrowing member 14 in an operating situation as does through the electric conductor element of the load current circuit.

The cross-sectional area of the narrowing member 14 in the axial ends thereof is the same as the cross-sectional area of that electric conductor element of the load current circuit, with which the narrowing member 14 is adapted to be connected in series. Between its axial ends, the narrowing member 14 comprises three narrowing portions nw1, nw2 and nw3, whose width is smaller than the width of the narrowing member 14 at the axial ends.

The task of the narrowing member 14 is similar to that of the PTC thermistor to be connected in series with the load current circuit, i.e. to improve the sensitivity of the load control apparatus to overcurrent. In an operating situation, the narrowing member 14 heats more strongly than the electric conductor element of the load current circuit connected in series therewith, and therefore the temperature-sensitive switch member S connected heat-conductively to the narrowing member 14 reacts more sensitively to overcurrent than a corresponding temperature-sensitive switch member connected heat-conductively to the electric conductor element.

In FIG. 4, the temperature-sensitive switch member S is connected heat-conductively onto the midmost narrowing portion nw2 such that the midpoint cp of the temperature-sensitive switch member S is on top of the midmost narrowing portion nw2. Between the temperature-sensitive switch member S and the narrowing member 14 is arranged an electrical insulating member 8 that electrically insulates the temperature-sensitive switch member S from the narrowing member 14, whereby the temperature-sensitive switch member S is electrically insulated also from the load current circuit in an operating situation.

The electrical insulating member is adapted to conduct heat well from a target element to the temperature-sensitive switch member. The electrical insulating member may comprise one or more material layers, each of which is of a well heat conductive solid or fluid material.

The electrical insulating member 8 is fixed to the narrowing member 14 with two fastening members 10, which may be screws, for example. The fastening between the temperature-sensitive switch member S and the electrical insulating member 8 may comprise a well heat conductive adhesive layer, for example.

Figure 5:
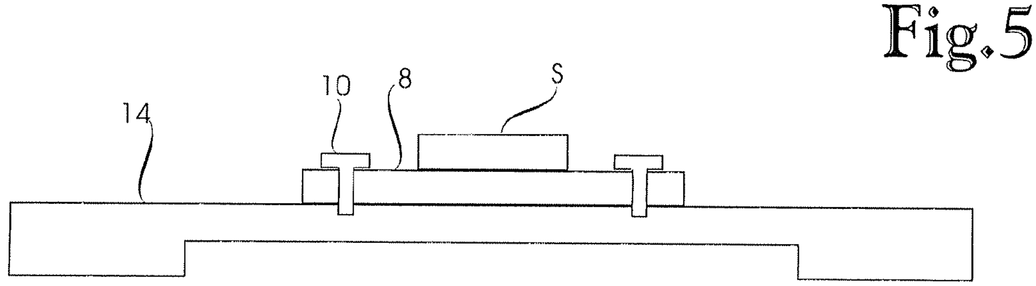
FIG. 5 shows a cross-section of the assembly of FIG. 4.

FIG. 5 shows a cross-section of the assembly of FIG. 4 taken along the midline A-B of the narrowing member. FIG. 5 shows that the narrowing member 14 comprises, between its axial ends, a portion whose thickness is smaller than the thickness of the narrowing member 14 in the axial ends. Herein, thickness refers to that dimension of the narrowing member 14, which is perpendicular to both the axial direction and the lateral direction. The portion having a decreased thickness extends over the narrowing portions nw1, nw2 and nw3 such that both the width and the thickness of the narrowing portions are smaller than the corresponding dimensions of the axial ends of the narrowing member 14.

FIG. 5 shows that there is no air gap between the temperature-sensitive switch member S and the narrowing member 14 in the radial direction. Herein, a radial direction refers to the direction perpendicular with respect to the current passing in the narrowing member in an operating situation. Since there is no air gap in the radial direction between the temperature-sensitive switch member S and the narrowing member 14, which is conducting in an operating situation, heat is conducted efficiently from the narrowing member 14 to the temperature-sensitive switch member S, thus enabling a rapid reaction of the temperature-sensitive switch member S to an overcurrent occurring in the narrowing member 14.

Figure 6:
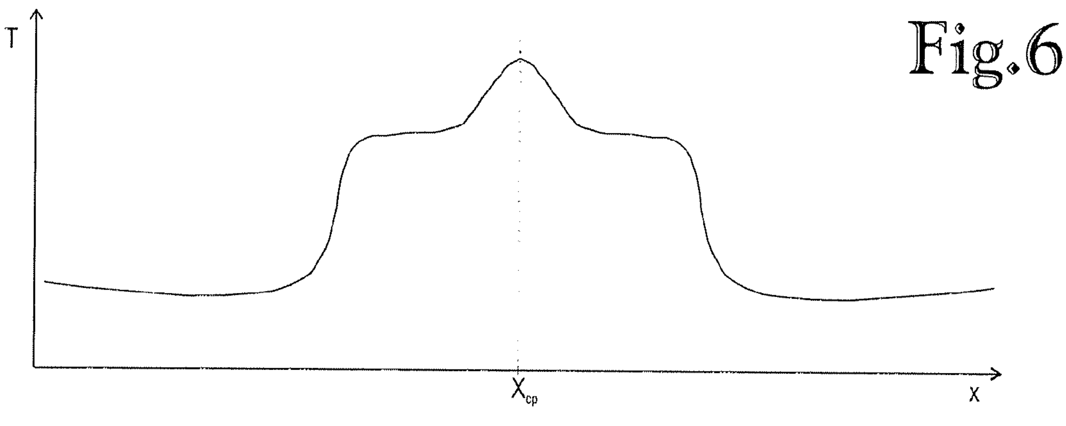
FIG. 6 shows the temperature distribution occurring in the narrowing member of the assembly of FIG. 4.

FIG. 6 shows the temperature distribution occurring in the narrowing member 14 of the assembly of FIG. 4. The horizontal axis x corresponds to the distance from the axial end of the narrowing member viewed along midline A-B. The vertical axis T corresponds to temperature. FIG. 6 shows that the hottest point of the narrowing member 14 is situated at the midpoint cp of the temperature-sensitive switch member S.

The narrowing member of the load control apparatus may be made from the same material as the electric conductor element with which the narrowing member is adapted to be connected in series. Alternatively, the narrowing member may be made from a material whose resistance increases as a function of temperature more steeply than the resistance of the electric conductor element, whereby the narrowing member is heated still more strongly under the influence of an overcurrent. Accordingly, the narrowing member may also serve as a PTC thermistor member.

The narrowing member may be connected to the electric conductor element of a load current circuit by soldering or with a bolt joint, for example. Alternatively, the narrowing member may be integrated into the electric conductor element. For example, the narrowing member may be achieved by arranging one or more narrowing portions in the electric conductor element of the load current circuit, such as a busbar, for example. Accordingly, the narrowing portion may also be retrofitted in the electric conductor element of the load current circuit for instance by cutting off pieces from the busbar of the load current circuit.

In the above text, overcurrent refers to a current magnitude that exceeds a predetermined limit value. Accordingly, an overcurrent does not have to be the highest allowable current of a load current circuit or a component thereof, but an overcurrent may be any exceeding of a limit value of interest to a user.

It is obvious to a person skilled in the art that the basic idea of the invention can be implemented in a variety of ways. Consequently, the invention and its embodiments are not restricted to the above examples, but may vary within the scope of the claims.

The invention claimed is:

1. A load control apparatus for connection with a load current circuit to indirectly detect an overcurrent, as a current magnitude exceeding a predetermined limit value, occurring in an electric conductor element belonging to the load current circuit, on the basis of an increase in temperature, the load control apparatus comprising:

a control current circuit including a temperature-sensitive switch member capable of changing its operational state in response to an increase in the temperature to a predetermined value; and a control unit adapted to detect a change in the operational state of the temperature-sensitive switch member, and to detect an overcurrent occurring in an electric conductor element based thereon, the control unit being configured to reduce current in the load current circuit as a response to a detected overcurrent, the temperature-sensitive switch member being adapted to be connected heat-conductively to a target element, in which at least part of the load current of the electric conductor element passes in an operating situation, and the temperature-sensitive switch member being further adapted to be electrically insulated from the electric conductor element of the load current circuit.

2. A load control apparatus as claimed in claim 1, wherein the temperature-sensitive switch member is adapted to be connected heat-conductively to the target element in such a manner that no air gap exists between the temperature-sensitive switch member and the target element in a radial direction perpendicular with respect to current passing in the target element during an operating situation.

3. A load control apparatus as claimed in claim 1, wherein the target element is the electric conductor element of the load current circuit.

4. A load control apparatus for connection with a load current circuit to indirectly detect an overcurrent as a current magnitude exceeding a predetermined limit value, occurring in an electric conductor element belonging to a load current circuit, on the basis of an increase in temperature, the load control apparatus comprising:

a control current circuit including a temperature-sensitive switch member capable of changing its operational state in response to an increase in the temperature to a predetermined value; and a control unit adapted to detect a change in the operational state of the temperature-sensitive switch member, and to detect an overcurrent occurring in the electric conductor element based thereon, the temperature-sensitive switch member being adapted to be connected heat-conductively to a target element, in which at least part of the load current of the electric conductor element passes in an operating situation, and the temperature-sensitive switch member being further adapted to be electrically insulated from the electric conductor element of the load current circuit; and a narrowing member adapted to be connected in series with the electric conductor element of the load current circuit, the narrowing member having a portion whose cross-sectional area is substantially smaller than a cross-sectional area of the electric conductor element of the load current circuit, and the target element being said narrowing member.

5. A load control apparatus as claimed in claim 4, wherein the narrowing member is made from a material whose resistance increases more steeply as a function of temperature than the resistance of the material of that electric conductor element of the load current circuit, with which the narrowing member is adapted to be connected in series.

6. A load control apparatus as claimed in claim 1, wherein the load control apparatus comprises:

a thermistor assembly including at least one thermistor member and being adapted to be connected electrically conductively to the electric conductor element of the load current circuit, and the target element being said thermistor assembly.

7. A load control apparatus as claimed in claim 6, wherein the type of the at least one thermistor member is a PTC thermistor, the at least one thermistor member being adapted to be connected in series with an electric conductor element belonging to the load current circuit.

8. A load control apparatus as claimed in claim 1, wherein the temperature-sensitive switch member is a normally closed-type switch member.

9. A load control apparatus as claimed in claim 1, wherein the load control apparatus comprises:

a plurality of series-connected temperature-sensitive switch members.

10. A frequency converter assembly comprising:

a load control apparatus as claimed in claim 1; and a load current circuit including the electric conductor element.

* * * * *